Jan. 8, 1963 W. H. HORTON 3,071,832
CLIP FOR DETACHABLY CONNECTING A CARRYING STRAP TO A CAMERA
Filed Nov. 4, 1960
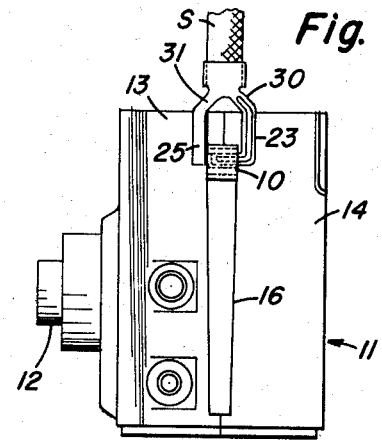
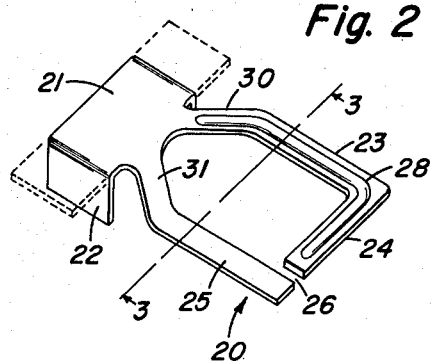
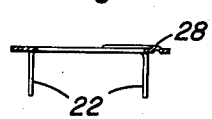
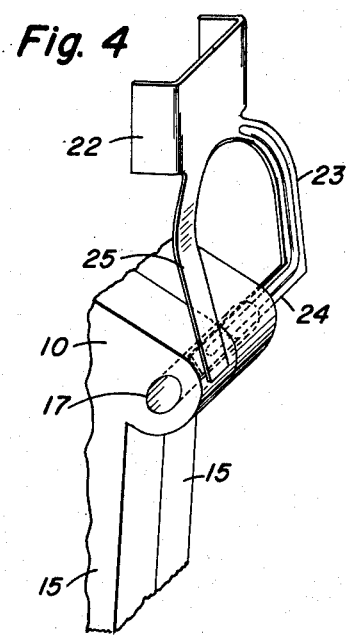
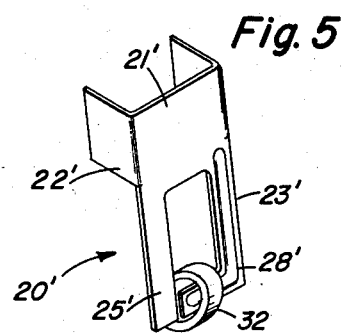
WILLIAM H. HORTON
INVENTOR.
BY R. Frank Smith
ATTORNEYS United States Patent Office 3,071,832
Patented Jan. 8, 1963

3,071,832
CLIP FOR DETACHABLY CONNECTING A CARRYING STRAP TO A CAMERA
William H. Horton, Rochester, N.Y., assignor to Eastman Kodak Company, Rochester, N.Y., a corporation of New Jersey
Filed Nov. 4, 1960, Ser. No. 67,333
4 Claims. (Cl. 24—265)

The present invention relates to a clip for detachably connecting a carrying strap to suitable eyelets or rings fixed to a camera body.

It is well known to provide photographic cameras, or their field cases, with flexible carrying straps by means of which the camera can be carried. Said carrying straps are generally placed around the neck of the user when using the camera so that when the camera is released it lies against the user's chest thus leaving his hands free. By virtue of this use such straps are sometimes called neck straps.

These carrying, or neck, straps are generally made from a flexible material, i.e., leather or woven fabric, and are attached to the camera, or its field case, by means of clips or rings permanently attached to the ends thereof which are adapted to engage eyelets or rings attached to the opposed sides or ends of the camera body, or its field case. Since it is conventional practice to supply the carrying straps with the camera or its field case, the clips or rings on the carrying strap have been of a type which was more or less permanently attached to the eyelets or rings on the camera body and were not readily removed therefrom except through the use of special tools or pliers and which operation required a deformation of the clip or ring which, if repeated many times, would permanently damage or destroy the clip. It is known that conventional snap clips, which work on the principle of the safety pin, have been used for the purpose of detachably connecting a strap, or other similar member, to an eyelet or ring, but such snap clips are relatively expensive to construct, cumbersome in appearance, and difficult to operate if made sufficiently small to be neat in appearance.

In the sale of very inexpensive cameras, box cameras of the type made for the premium trade, it has been found desirable to supply the camera without a carrying strap in order to keep the price of the camera to a minimum. Since the carrying straps for these inexpensive cameras are to be supplied as a separate accessory, it was necessary to provide such straps with attaching clips which would permit the purchaser to readily attach the same to suitable eyelets provided on the camera body for this purpose. By the same token, since these attaching clips form a part of a carrying strap which must be very inexpensive, they must be of such a design as to add a minimum cost to the carrying strap.

Accordingly, the primary object of the present invention is to provide an attaching clip for a camera carrying strap which is very inexpensive to manufacture and can be readily attached to, and disconnected from, the eyelets or other attaching member of a camera body by the purchaser without the need of any tools.

A further object of the invention is to provide an attaching clip of the type mentioned which can be stamped from a single piece of metal in one operation.

And yet another object is to provide an attaching clip of the type mentioned which comprises a substantially rigid L-shaped arm extending from an anchor portion adapted to be permanently connected to the carrying strap, the cross arm of said L-shaped portion being adapted to be inserted through the eyelet on the camera body when a resilient arm, also extending from the anchor portion, is bent transversely from its normal position in which it lies substantially in the plane of said cross arm and in spaced relation therein to confine the eyelet on the camera on said cross arm.

The novel features that I consider characteristic of my invention are set forth with particularity in the appended claims. The invention itself, however, both as to its organization and its mode of operation, together with additional objects and advantages thereof, will best be understood when read in connection with the accompanying drawings in which:

FIG. 1 is a side elevational view of a well known type of box camera showing a carrying strap connected to an eyelet on one end thereof by an attaching clip constructed in accordance with a preferred embodiment of the present invention;

FIG. 2 is an enlarged perspective view of the attaching clip per se;

FIG. 3 is a sectional view taken substantially on line 3—3 of FIG. 2;

FIG. 4 is an enlarged perspective view showing how the straight arm of the attaching clip is bent transversely to permit the cross arm thereof to be slipped into or out of the eyelet of the camera body; and FIG. 5 is an enlarged perspective view of another modification of the attaching clip designed for attachment to a ring or other type of connecting member on a camera or other member, which is more narrow than the eyelet which the preferred modification of the clip is designed to engage.

Referring now to FIGS. 1–4, the present attaching clip is designed for detachable connection to an eyelet 10 molded as an integral part of a plastic body of a well known box camera 11 having a lens mount 12. This camera body 11 is molded in two parts, a front part 13 and a rear part 14, and one-half of the eyelet 10 is formed at the top of an upstanding rib 15 integral with each camera part so that when the camera parts are assembled the two parts of the eyelet are aligned to form a single eyelet of substantial width, having a hole 17 extending completely therethrough as shown in FIG. 4. The camera parts are held in assembled relation with a metal clip 16 which embraces and is clinched over the rib 15 on each camera part and overlies the surface of the eyelet 10. This metal clip 16 is shown in FIG. 1, hence the reason why the dividing line between the camera parts doesn't show the full height of the camera body, but the clip is omitted in FIG. 4. Since the manner in which the camera parts are formed and assembled are of no significance to the present invention, except to show that the eyelet 10, which the attaching clip of the present invention is adapted to engage, is of substantial width, only so much of the same has been described as to point out the size and shape of the eyelet. For a more detailed description of this camera construction reference to copending application Serial No. 737,447, filed May 23, 1958, now Patent No. 3,003,229 can be had.

Referring now to FIG. 2, a preferred embodiment of an attaching clip 20 constructed in accordance with the present invention is preferably made from thin metal and includes an anchor portion 21 in the form of a U which can be clinched over, or otherwise permanently attached to, one end of a carrying strap S which may be made of a flexible material, ie.., woven fabric, leather, etc. If the clip is stamped from a sheet of thin metal, the turned-down wings 22 of the anchor portion will originally lie flat in the plane of the clip and will be subsequently turned down, as shown, to provide a means for attaching the clip to the ends of the carrying strap. Extending from one side of the anchor portion 21 is an arm 23, the lower portion of which is L-shaped and the cross arm 24 of which is long enough to extend completely, or substantially, through the hole 17 of the eyelet 10. Extending from the other side of the anchor portion 21 is a second arm 25 which is long enough to extend across the end of the cross arm 24 but which is spaced slightly therefrom as shown at 26. The clip should be made of a resilient material so that arm 25 can be manually bent transversely out of alignment with the end of cross arm 24 to permit arm 24 to be inserted into or removed from the eyelet 10, see FIG. 4. After the cross arm 24 is inserted into eyelet 10, the arm 25 will snap back to its normal position in the plane of cross arm 24 and prevent said cross arm from being withdrawn from, or inserted into, the eyelet.

Since the L-shaped arm 23, including cross arm 24, is relied upon to support the weight of the camera, it should be fairly rigid. To this end the arm 23, along with cross arm 24, is embossed longitudinally of their length as shown at 28, and this strengthens this part against both transverse bending and a tensile stress in its own plane. Looking at FIGS. 2 and 4, it will be seen that since arm 25 lies outside the eyelet 10 it is an easy matter for one to manually grasp the arm near its end and bend it transversely forward or backward out of the plane of cross arm 24 to permit the cross arm to be inserted into or removed from the eyelet 10.

Because of the width of the eyelet 10, the overall width of the eyelet engaging portion of the attaching clip is greater than the width of the anchor portion 21 so that arms 23 and 25 are shown connected to the anchor portion by outwardly flared portions 30 and 31, respectively. Should the part to which this attaching clip is adapted to be detachably connected be narrow, such as a ring 32 shown in FIG. 5, then the corresponding arms 23' and 25' of the attaching clip could extend straight down from the sides of the anchor portion 21' so that the overall width of the attaching clip is substantially the same throughout and substantially the width of the carrying strap to which it is anchored. Inasmuch as the embodiment of the attaching clip 20' shown in FIG. 5 differs from that shown in FIGS. 1–4 only in the shape and/or size of the respective parts, corresponding parts in the FIG. 5 embodiment have been designated by the same reference character primed (').

From the above description it will be appreciated that I have invented an attaching clip for carrying straps which can be manually attached and detached relative to an eyelet or ring on the member to be carried without requiring the use of any tools or without requiring the permanent deformation of the clip, or a part thereof, which if repeated enough times would destroy the same. Furthermore, this clip, while very inexpensive to manufacture, is very strong and neat in appearance. While I prefer to stamp this clip from a sheet of thin, resilient metal in one operation, it is conceivable that it could be molded from a plastic material which would be flexible in a direction transverse to its plane to permit the required flexing of arm 25 or its equivalent for detachably connecting the clip to an eyelet, but sufficiently rigid in a direction in its plane to support the weight of a part to which it might be connected.

Although I have shown and described certain embodiments of an attaching clip constructed in accordance with preferred forms of my invention, I am fully aware that many modifications thereof are possible. My invention, therefore, is not to be limited to the precise details shown and described but is intended to cover all modifications coming within the scope of the appended claims.

Having thus disclosed my invention, what I claim is new and novel and desire to secure by Letters Patent of the United States is:

1. An attaching clip for detachably connecting a carrying strap to a rigid eyelet on a camera body, or the like, and comprising a U-shaped anchor portion the arms of which are adapted to be clinched around the end of said strap to permanently fasten said anchor portion thereto; a rigid, substantially L-shaped arm having the end of its leg integral with and extending from one side of the cross member of said anchor portion and its cross arm spaced from and substantially parallel to the cross member of said anchor portion and adapted to extend through and form a pivotal support for said eyelet; a second arm having one end integral with and extending from the other side of the cross member of said anchor portion in spaced relation with the leg of said L-shaped arm and terminating in an end which normally lies in the plane of said cross arm but spaced therefrom by an amount to confine said eyelet from movement off said cross arm when the latter is inserted through said eyelet; said second arm being resilient in a direction transversely of said cross arm to allow it to be flexed in this direction and out of the plane of said cross arm to permit slipping of said cross arm into and out of said eyelet for attaching and detaching, respectively, the carrying strap to and from said eyelet.

2. An attaching clip according to claim 1, wherein said L-shaped arm and said second arm, in their entirety, normally lie in a single plane.

3. An attaching clip according to claim 1, wherein said clip is formed from a single piece of thin metal, and said L-shaped arm being reinforced to give it rigidity against movement in all directions, and particularly in a direction transversely of its own plane.

4. An attaching clip according to claim 3 wherein said L-shaped arm is reinforced by being embossed longitudinally substantially throughout its length.

References Cited in the file of this patent

UNITED STATES PATENTS

| | | |
|---|---|---|
| 160,970 | Tilden | Mar. 16, 1875 |
| 225,626 | Melendy | Mar. 16, 1880 |
| 1,648,016 | Freysinger | Nov. 8, 1927 |
| 1,716,052 | Hagel | June 4, 1929 |
| 1,834,046 | Brooks | Dec. 1, 1931 |
| 1,886,110 | Lippstadt | Nov. 1, 1932 |
| 2,009,483 | Dinhofer | July 30, 1935 |
| 2,135,771 | Roof | Nov. 8, 1938 |
| 2,675,766 | Johnson | Apr. 20, 1954 |
| 2,780,851 | Grais | Feb. 12, 1957 |
| 2,876,521 | Legman | Mar. 10, 1959 |